United States Patent [19]
Mellem et al.

[11] Patent Number: 5,697,397
[45] Date of Patent: Dec. 16, 1997

[54] REMOTE VALVE CONTROL ACTUATOR APPARATUS

[76] Inventors: Jar Mellem, 220 Otis St., Santa Cruz, Calif. 95060; Marshall C. Wiseman, 113 Cherry Blossom La., Aptos, Calif. 95003

[21] Appl. No.: 510,172

[22] Filed: Aug. 2, 1995

[51] Int. Cl.$^6$ ............... F16K 31/02; F16K 31/10
[52] U.S. Cl. ............... 137/315; 251/68; 251/74; 251/129.04; 251/129.2; 251/263; 251/292
[58] Field of Search ............... 137/315; 251/75, 251/76, 79, 80, 81, 129.02, 129.04, 129.15, 292, 263, 129.2, 68, 74

[56] References Cited

U.S. PATENT DOCUMENTS

| | | | |
|---|---|---|---|
| Re. 30,135 | 11/1979 | Fitzwater et al. | 251/68 |
| 944,927 | 12/1909 | Walker | 251/68 |
| 2,382,720 | 8/1945 | Hopkins | 251/68 |
| 2,591,216 | 4/1952 | Thompson et al. | 251/68 |
| 2,753,030 | 7/1956 | Wight | 251/79 |
| 2,827,259 | 3/1958 | Kindt | 251/80 |
| 2,855,940 | 10/1958 | Milleville et al. | 251/76 |
| 2,992,807 | 7/1961 | Karlby et al. | 251/76 |
| 3,461,894 | 8/1969 | MacLennan | 251/68 |
| 3,466,005 | 9/1969 | Kleeberg | 251/76 |
| 3,504,684 | 4/1970 | Ziccardi | 251/76 |
| 3,556,467 | 1/1971 | Ziccardi | 251/76 |
| 5,193,780 | 3/1993 | Franklin | 251/68 |

Primary Examiner—George L. Walton
Attorney, Agent, or Firm—Jeffrey A. Hall

[57] ABSTRACT

An apparatus for controlling the a valve by a coded electromagnetic signal comprises a saddle assembly for installation on a valve. The saddle assembly includes an aperture allowing for placement over a valve stem and a valve saddle having two arm elements which are secured to a saddle plate and extend around the valve. A drive drum is secured to the saddle assembly and includes a drive drum tube. Drive plates are secured to the drive drum tube and are separated by drive drum alignment spacers. Drive plate drive channels guide a non-stationary post attached to plurality of drive springs secured to an upper and a lower stationary guide plate. A plurality of stationary guide plates includes an aperture through which a drive drum tube passes allowing the drive drum to rotate freely. A plurality of guide plates are linked to a hammer shaft and a hammer cam which is released by a trigger activated by the coded electromagnetic signal which allows the rotation of the drive drum and turning of the valve stem.

10 Claims, 6 Drawing Sheets

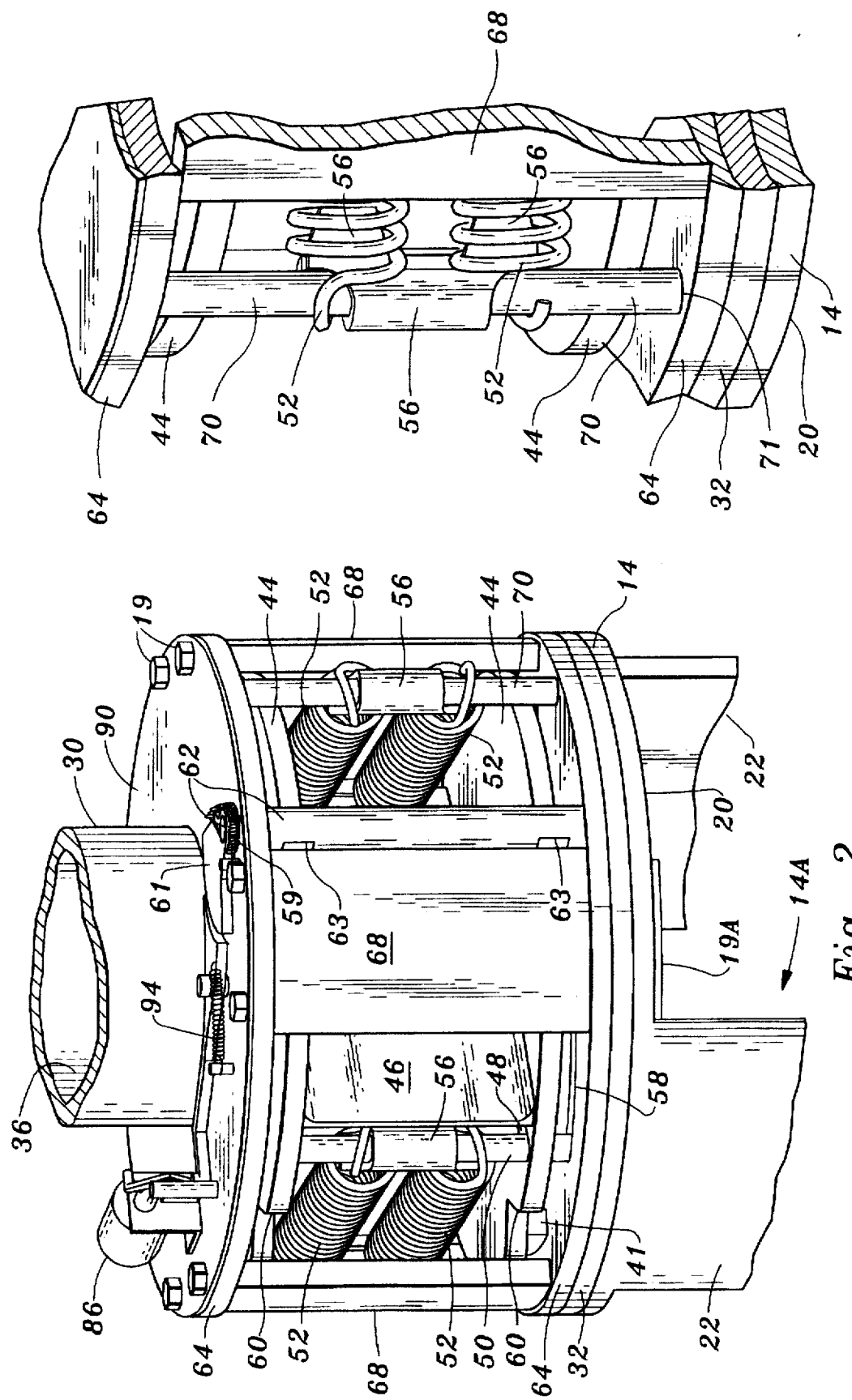

REMOTE VALVE CONTROL ACTUATOR APPARATUS

BACKGROUND OF THE INVENTION

1. Field of Invention

This invention relates to valve control apparatuses including one-quarter turn valve control apparatuses, and more particularly to valve control apparatuses which may be controlled and activated from a distance allowing for valves and distribution systems to be monitored and controlled from a location remote from the valve itself thereby allowing valve and distribution systems to be shut-off in case of an emergency such as an earthquake or other event while still accommodating manual control by conventional means, and which may be retro-fitted onto existing valves.

2. Description of the Related Art

Various valve control apparatuses have been proposed and implemented to effect the opening and closing of various valve types. Although these apparatuses are suitable for routine application, there exists a significant need for a valve control apparatus which may be controlled and monitored from a distance from the valve itself. This need is especially critical to control secondary damage following natural disasters such as earthquakes where a significant amount of damage which is not caused directly by the earthquake itself is from the failure of systems such as gas and water lines, and the inability to shut down and control such systems in emergencies.

For example, in recent major earthquakes in California and Japan, the inability to control the flow of gas in a timely fashion contributed significantly to the secondary damage, and in California has been a major factor in gas fires caused by over pressurization of distribution piping. Of course there are many situations aside from earthquakes where it would be highly desirable to have a means to control gas, water and other valves from a distance, such as in toxic containment fields, storms, fires, land slides, seismic movement, and other natural and man-made events.

At the present time, most utility companies have and maintain block or mainline valves. These valves are essential to isolate portions of the utilities gas distribution systems. In emergency gas leak situations such block valves are critical to isolate broken sections of the gas lines. Such block valves suffer from two significant drawbacks. First, they require a utility worker to physically go to the valve and turn it off. With the present trend towards the down sizing of utility companies, the number of qualified technicians and the increased distance they must travel, often results in a significant amount of time passing between the decision to terminate service in a particular area and the actual turning off of the valve. Second, once a technician arrives at the site, he or she must locate and access the particular valve. During earthquakes and other events such access may be blocked by collapsed buildings, trees, and shifted earth. In such emergencies traffic and emergency vehicles can also obstruct access to such block valves.

It has been proposed that earthquake valves could be installed in place of existing block valves, however, such seismic valves also have significant shortcomings. For example, an earthquake valve will automatically turn a gas valve off if the earth moves. Such valves have no means of determining if it is turning off the valve for a main quake or an aftershock. If earthquake valves had been in place during the recent earthquakes in California, fire damage may have been reduced and gas lines shut off due to the automatic termination of gas service. However, large numbers of people would have been without gas service because seismic valves would have automatically shut off the gas regardless of pipeline damage.

Current gas leak technology has no way of determining pipe line failures without the gas being turned on. This means, for example, if earthquake valves were in place in Los Angeles prior to the recent Northridge quake, significant numbers of people would be without gas. The only way to reinstate service would be by energizing and testing block by block for gas leakage. If an aftershock occurs, then the whole process would be repeated resulting in needless expense and inconvenience.

It would be highly desirable therefore to have a means to isolate a pipe failure without depriving the entire distribution system of service. This is particularly true regarding gas distribution systems, however, it is also applicable in other situations as well such as water lines, hazardous waste material holding sites, chemical tank yards, and the like. Ideally, such a means or apparatus would be controllable remotely, could be retro-fitted to existing and operating valves, and could be installed, inspected, replaced and tested without the discontinuance or interruption of service.

The apparatus of the present invention allows for installation on existing gas valves or other valves which will enable an operator at a remote site to open or close the valve using a specific radio frequency signal. The present invention utilizes reports from the field being channeled to a main gas valve dispatcher who, using the present invention, has the ability to close any valve or number of valves in the system with a specific coded radio frequency signal. At the present time, field reports from customers, police, and fire personnel are channeled into a gas dispatch office. That office then dispatches utility personnel into the field to drive to a specific valve to shut it down. Depending upon the proximity of the utility personnel, traffic conditions, and other variables, actual response time may vary from minutes to hours. The present invention enables such response time to be decreased to a matter of seconds, and enables a single dispatcher to shut off one valve or hundreds of valves within seconds from a central control point.

Accordingly, it is the primary object of this invention to provide an apparatus which enables opening or closure of a valve actuated by a coded radio signal. It is a further object of the invention to provide such an apparatus which may be actuated in areas of limited access due to valve location or surface conditions and which may be retro-fitted to existing operating valves. It is a still further object of this invention to provide such an apparatus which can be installed, inspected, replaced, and tested without the discontinuance or interruption of service.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

SUMMARY OF THE INVENTION

To achieve the foregoing objects, and in accordance with the purpose of the invention as embodied and broadly described herein, an apparatus for controlling the opening and closure of a valve by a coded electromagnetic signal is provided, comprising: saddle plate means for operable installation on said valve; said saddle plate means including an aperture therein allowing for placement of said saddle plate means over a valve stem of said valve; said saddle plate means including two arm elements extending therefrom for securing around the valve; a drive drum operably secured to said saddle plate means; said drive drum including a drive drum tube for inserting through said aperture in the saddle plate means and being operably aligned with a valve stem drive plate; a pair of drive plates are attached to said drive drum tube and separated by alignment spacers; drive plate guide channels guide a non-stationary post attached to a plurality of drive springs secured by a stationary post which passes through an upper and a lower stationary guide plate, said plurality of springs being separated by a drive spring spacer element and operably secured to said drive drum; a plurality of stationary guide plates, said plurality of stationary guide plates including an aperture through which said drive drum tube passes allowing the drive drum to rotate freely; said plurality of stationary guide plates being operably linked to a hammer shaft and a hammer shaft cam; and, signal means for activating and energizing a trigger means for releasing the hammer cam, the hammer shaft being moved thereby, allowing for rotation of said drive drum and turning of the valve stem of the valve allowing for closure of the valve.

The hammer shaft is preferably cylindrically configured allowing for operable combination with a pivot hole in an upper stationary guide plate and a pivot hole in a lower stationary guide plate. The hammer shaft preferably includes two contact surfaces which correspond to a pair of hammer stay notches in the drive plates.

In accordance with the present invention there also is provided an apparatus for controlling the closure of a valve at a distance from the valve which can be installed, inspected, replaced, and tested on the valve without disruption of the operation of the valve, comprising: plate means for operable installation on said valve, said plate means including an aperture therein allowing for placement of said plate means over a valve stem of said valve; said plate means being secured to a valve saddle and include two elongated arm elements for operable engagement with the valve; a drive drum operably secured to said plate means; said drive drum including a drive drum tube for insertion through said aperture in said plate means and being operably aligned with a valve stem drive plate; a pair of drive plates, said drive plates being secured to said drive drum tube and separated by alignment spacers; one or more drive plate channels guide a non-stationary post attached to a plurality of drive springs secured by a stationary post to the upper and a lower stationary guide plate; said plurality of springs being separated by a drive spring spacer element and being operably secured to said drive drum; a plurality of stationary guide plates, said plurality of stationary guide plates each including an aperture therein through which said drive drum tube passes allowing said drive drum tube to rotate freely; said plurality of stationary guide plates being operably linked to a hammer shaft and a hammer shaft cam; and, signal means for signaling and activating trigger means for releasing said hammer cam, said hammer shaft being moved by the release of the hammer cam and move thereby allowing for rotation of said drive drum and turning of the valve stem of the valve.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 2 is a side perspective view of such apparatus in released position with the outer housing removed, according to the invention.

FIG. 3 is a perspective view of the drive plates, drive spring spacer, and stationary post of such apparatus, according to the invention.

DESCRIPTION OF THE PREFERRED EMBODIMENTS

Figure 1:
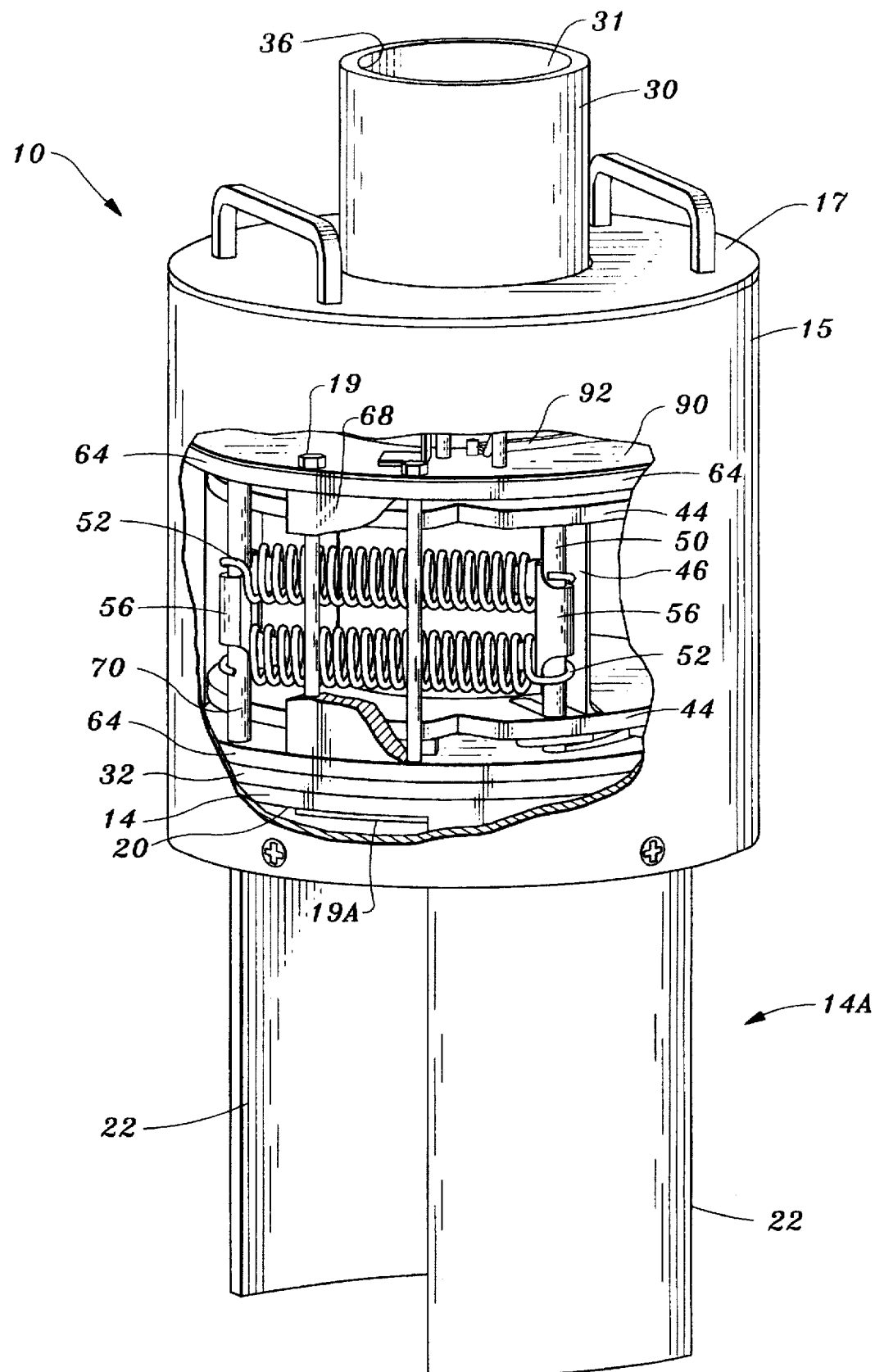
FIG. 1 is a perspective view of a remote valve control actuator apparatus in released position, according to the invention.

Reference will now be made in detail to the present preferred embodiments of the invention as illustrated in the accompanying drawings.

In accordance with the present invention, there is provided an apparatus for controlling the opening or closure of a valve by a coded electromagnetic signal, comprising in a preferred embodiment: saddle plate means for operable installation on said valve; said saddle plate means including an aperture therein allowing for placement of said saddle plate means over a valve stem of said valve; said saddle plate means being operably attached to the valve; said saddle plate means being attached to a valve saddle and include two arm elements extending therefrom and around the valve; a drive drum operable secured to said saddle plate means; said drive drum including a drive drum tube for inserting through said aperture in the saddle plate means and being operable aligned with a valve stem drive plate; a pair of drive plates are attached to said drive drum tube and are separated by alignment spacers; drive plate channels guide in conjunction with stationary guide plate channels guide the non-stationery posts. The non-stationary posts are attached to a plurality of drive springs operable secured to a plurality of stationary posts secured to the stationary plates comprising an upper and a lower stationary guide plate. The plurality of springs are separated by a drive spring spacer element and operably secured to said drive drum; a plurality of stationary guide plates, said stationary guide plates including an aperture through which said drive drum tube passes allowing the drive drum to rotate freely; said plurality of stationary guide plates being operably linked to a hammer shaft and a hammer shaft cam; and, signal means for activating and energizing a trigger means for releasing said hammer cam, said hammer shaft being released to rotate, thereby allowing for rotation of said drive drum and turning of the valve stem.

In accordance with the present invention, there is also provided in another embodiment of the invention an apparatus for controlling the opening and closure of a valve at a distance from the valve comprising: a plate means for operable placement and installation on said valve, said plate means including an aperture therein allowing for placement of said plate means over a valve stem of said valve; said plate means being secured to a valve saddle and includes two elongated elements attached thereto and extending around the valve; a drive drum operably secured to said plate means; said a drive drum including a drive drum tube and being operably aligned with a valve stem drive plate; a pair of drive plates, said drive plates being secured to said drive drum tube and separated by alignment spacers; one or more drive plate channels guide a non-stationary post attached to a plurality of drive springs secured by stationary posts to an upper and a lower stationary guide plate. The plurality of springs being separated by a drive spring space element and being operably secured to said drive drum; a plurality of stationary guide plates comprising upper and lower plates each include an aperture therein through which said drive drum passes thereby allowing said drive drum to rotate freely; said plurality of upper and lower stationary guide plates being operably linked to a hammer shaft and a hammer shaft cam; and, signal means for signaling and activating trigger means for releasing said hammer cam, said hammer shaft being moved by the release of the hammer cam allowing for rotation of said drive plates and drive drum thereby turning the valve stem of the valve.

Figure 1A:
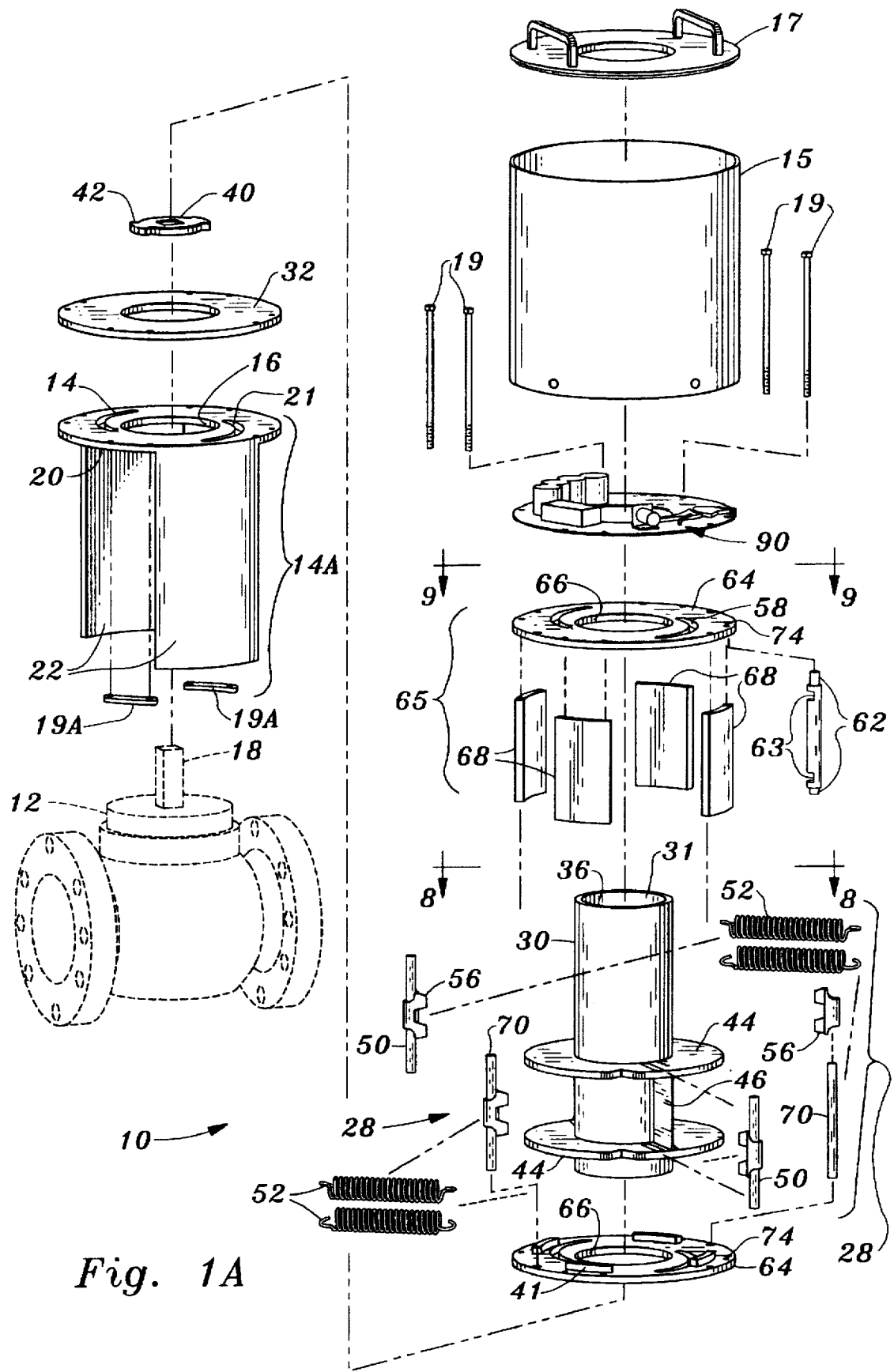
FIG. 1A is an exploded view of a remote valve control actuator apparatus, according to the invention.

In FIGS. 1 and 1A, the remote valve control actuator apparatus 10 is shown according to a preferred embodiment of the invention with saddle assembly 14A, including saddle plate 14, saddle clamps 19A, outer housing 15, and housing lid 17. Apparatus 10 is preferably secured to a valve 12 having a valve stem 18. In the preferred embodiment of the invention, apparatus 10 comprises four functional assemblies the saddle assembly 14A, drive drum assembly 28, stationary guide plates assembly 65, and the trigger assembly 90, which will be described in detail with reference to FIGS. 1 to 9.

With specific reference to FIGS. 1 and 1A, the saddle plate assembly 14A is shown with other elements of apparatus 10 and preferably comprises a saddle plate 14 with saddle plate adjustment slots 21, saddle plate 14 is preferably provided with a curved configuration and includes an aperture 16 centrally positioned therein. Aperture 16 allows saddle plate 14 to be operably installed on valve 12 over the top of valve stem 18 and further secured with saddle clamps 19A. Valve saddle 22 positioned below lower face 20 of saddle plate 14 preferably is positioned and rests on the body of valve 12. It is preferable to stabilize saddle plate 14 because of the significant rotational forces apparatus 10 is subject to in the operation of valve 12. Rotational dampening and plate stability is achieved by means of attaching saddle plate 14 to valve saddle 22 as seen in FIGS. 1 and 1A. Valve saddle 22, in the preferred embodiment, includes two ridged arms which extend from the saddle plate 14 around valve 12 and secured with fasteners 19, which may be clamps or other mechanical fastening means well known in the art. Of course, apparatus 10 may be used on a wide variety of valve types and configurations and the proper fitting and adaptations may be made by modifying the saddle as desired. Both saddle plate 14 and valve saddle 22 are preferably composed of durable, resilient, non-corrosive materials such as high density plastics, aluminum, stainless steel, and the like. Such material considerations apply to other components of apparatus 10 as well as its use will often be in underground valve locations requiring the use of durable, resilient, non-corrosive, and non-explosive material.

As shown in FIGS. 1–9 apparatus 10 may be configured for use on a wide variety of valves and valve types. Drive drum assembly 28 preferably includes drive drum tube 30 which is operably positioned in aperture 16 in saddle plate 14 and through centrally positioned apertures in lower base plate 32, guide plate assembly 65, trigger assembly 90, and housing lid 17. Interior walls 36 of the drive tube have drive cogs 38 which preferably protrude into the interior space of drive drum tube 30, best seen in FIG. 8. Drive cogs 38 are preferably aligned with valve stem drive plate 40 seen in FIGS. 1A and 8. Valve stem drive plate 40 functions to couple drive forces from apparatus 10 to valve stem 18. Valve stem drive plate 40 is removable through main drive tube 30 allowing for disengagement of apparatus 10 during inspection and testing without the removal of apparatus 10 from valve 12. These are very useful and highly desirable attributes of apparatus 10 as it permits both maintenance and testing of both apparatus 10 and valve 12 without the removal of apparatus 10 from the valve or the need to re-install after such operations.

Drive drum tube bore 31 of drive tube 30 allows for convenient access to valve stem 18. The positioning and placement of drive cogs 42 on valve stem drive plate 40, best seen in FIG. 8, allows for manual operation of valve 12 without restricting access or removal of apparatus 10 from the valve and allows for a very wide range of uses and applications of apparatus 10 as many different valve stem configurations are easily accommodated.

In reference to FIGS. 1, 1A, 2, 3, and 9 drive drive plates 44 are shown attached to main drive drum tube 30. Drive plates 44 are preferably separated by inner alignment spacers 46 best seen in FIGS. 1, 1A, and 7. Inner alignment spacers 46 provide strength and rigidity to the drum as well as plate spacing. Although drive drum tube 30, upper and lower drive plates 44, inner alignment spacers 46, and drive cogs 38 have been described herein as separate parts of drive drum assembly 28 for illustrative purposes, in the manufacture and production of apparatus 10, these parts may alternatively form a one piece drive drum.

Figure 9:
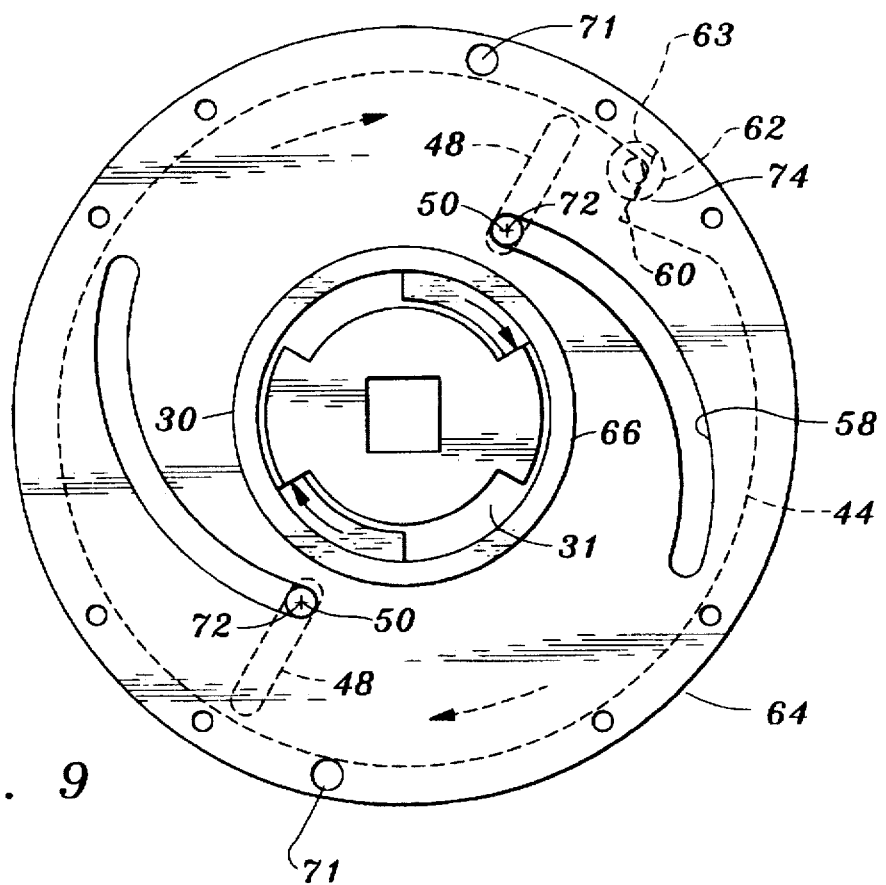
FIG. 9 shows the alignment of the drive plate guide channels of such apparatus, according to the invention.

Referring now to FIG. 9, drive plate guide channels 48 and upper and lower stationary guide plate channels 58 guide the non-stationary posts 50. Non-stationery posts 50 attach and are secured to drive springs 52, seen in FIGS. 1 and 1A, which are also attached to stationary posts 70 which insert into the upper and lower stationary guide plates. In the preferred embodiment drive springs 52 may comprise two, four, or a multiplicity of springs depending upon the specific application, with four being preferred. Drive spring spacers 56 seen in FIGS. 1A and 3, space and position springs 52 and prevent the springs from interfering with each other. Drive spring spacers 56 also provide support for both stationary posts 70 and non-stationary posts 50 thereby preventing any contortions therein.

Figure 7:
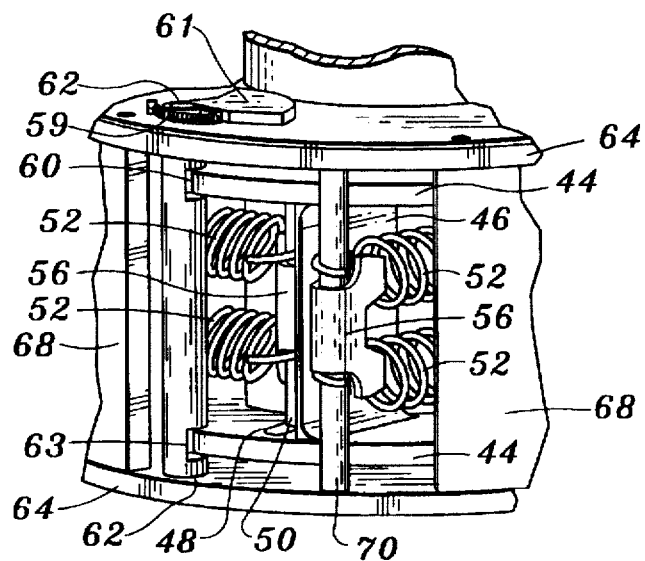
FIG. 7 shows the hammer shaft, hammer shaft notch, drive plate, and main drive tube of such apparatus, according to the invention.
Figure 8:
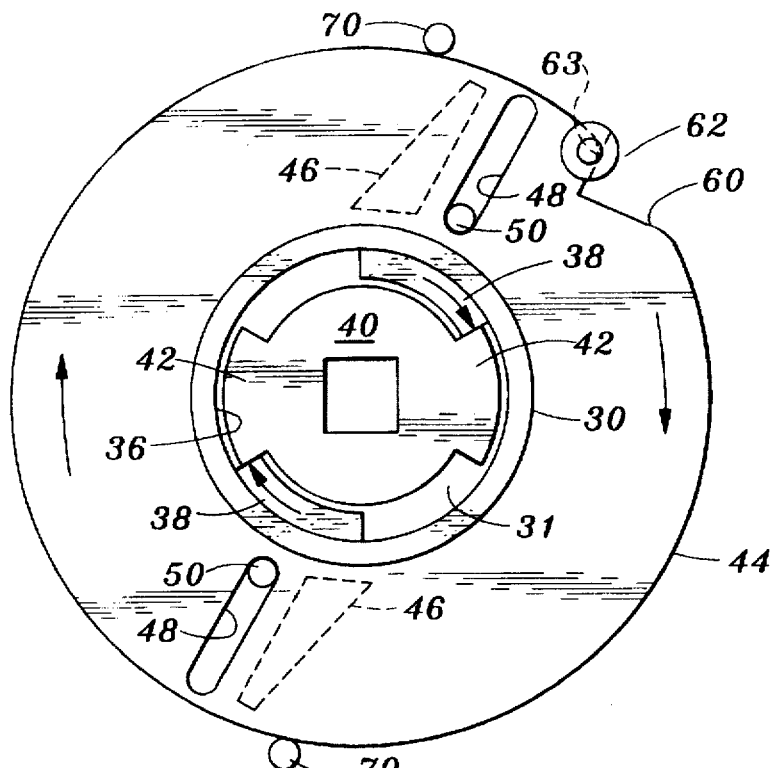
FIG. 8 is a top view of the hammer stay notch in the drive plate and the valve stem drive disk of such apparatus, in the cocked position, according to the invention.

With reference now to FIGS. 8 and 9, drive plate channels 48, shown in the "cocked" position, are operably aligned with the upper and lower stationary guide plate channels 58 shown in FIG. 9 allowing for the smooth and even distribution of spring force from springs 52 over the entire travel span of drive drum 28 engaging the valve stem drive plate 40 and the resultant turning of valve stem 18 on valve 12. In FIG. 8, a hammer stay notch 60 is cut into the outer circumferences of the drive plates 44. When springs 52 are stretched by rotating the drive drum assembly, notch 60 allows hammer shaft 62 to rotate into position effectively restraining drive plates 44, seen in FIG. 7 and 8, and allows apparatus 10 to be operably "cocked" and ready for activation.

In FIGS. 1A, 2, and 9, stationary guide plates 64 are shown positioned above upper drive plate 44 and between lower drive plate and the saddle plate 14, and may include stationary guide plate slides 41. Drive drum tube 30 passes through central aperture 66 of stationary plates 64 allowing the drive drum to rotate freely. Outer alignment spacers 68 are used to prevent stationary guide plates 64 from binding drive plates 44 and are preferably positioned between the upper and lower stationary guide plates 64.

In the preferred embodiment, the outer diameter of drive plates 44 is less than the outer diameter of stationary guide plates 64 so as to accommodate spacers 68. This difference in plate diameters also allows for the installation of stationary spring post 70 to be secured and positioned in anchor hole 71 in stationary guide plates 64, seen in FIGS. 1A, 3, and 9.

Upper and lower stationary guide plates 64 are preferably installed over drive drum tube 30 allowing the drive drum tube to rotate freely. Guide channels 48 and 58 are operably aligned with both the stationary guide plate 64 and the drive plates 44 and create an intersection 72, best seen in FIGS. 8 and 9. Intersection 72 accommodates non-stationary post 50 so that when drive drum 28 is rotated, non-stationary post 50 may move in an arc determined by the guide channels 58 in the upper and lower guide plates. This arc allows the energy from the spring load to be distributed to drive drum 28 over the entire travel of the spring.

In reference now to FIGS. 1A, 7, and 9, hammer shaft 62 is preferably cylindrically configured with both ends configured to fit within pivot holes 74 in upper and lower stationary guide plates 64. Preferably, the tolerances between the ends of hammer shaft 64 and pivot holes 74 is such to allow hammer shaft 62 to turn freely. Hammer shaft 62 is preferably configured with two contact areas, which are preferably flattened, and which coincide with hammer stay notches 60 in drive plates 44, best seen in FIGS. 7 and 8. Once apparatus 10 is operably secured to valve 12 and positioned, the rotation of the drive drum to the "cocked" position allows the hammer shaft 62 to rotate into position. At this point the trigger will drop into position in front of the hammer cam 61 restraining the hammer shaft from rotating which will in turn restrain the drive plate 44 allowing apparatus 10 to be "cocked" and prepared for activation.

Figure 5:
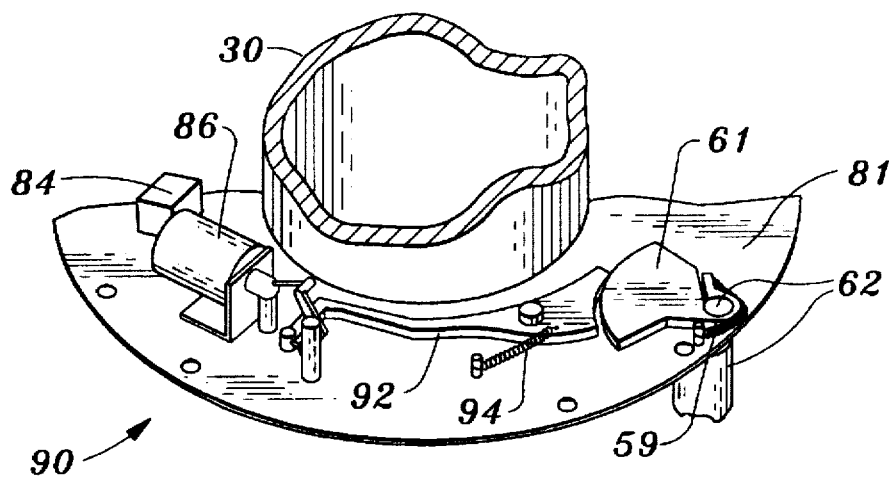
FIG. 5 is a perspective view of the trigger means in released position of such apparatus, according to the invention.
Figure 5A:
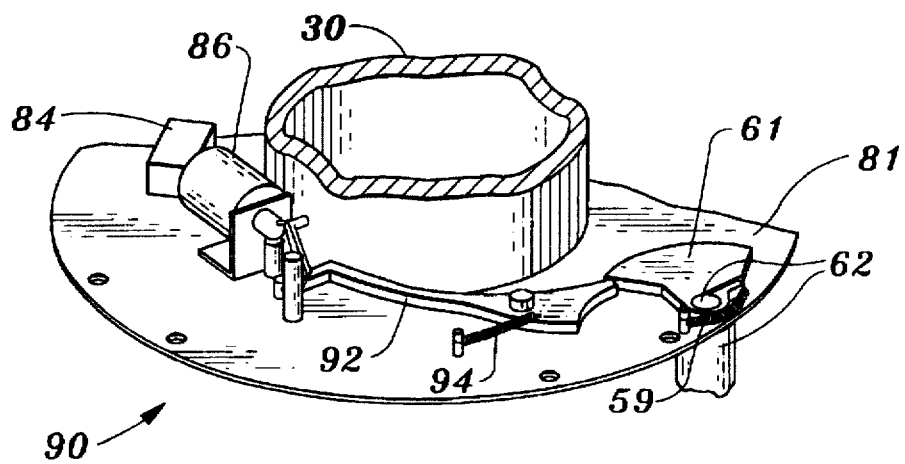
FIG. 5A is a perspective view of the trigger means in cocked position, according to the invention.
Figure 6:
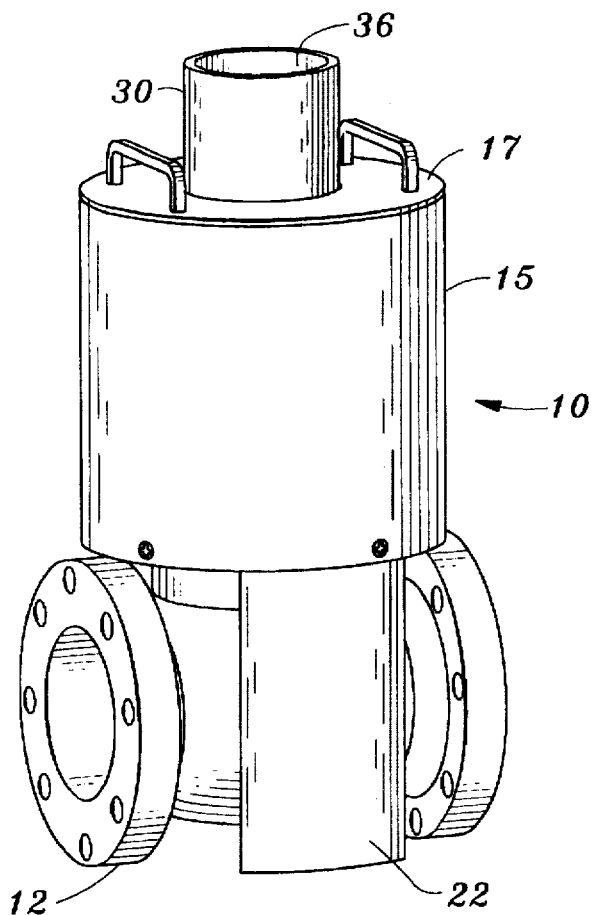
FIG. 6 shows such apparatus mounted to a valve body, according to the invention.

Hammer shaft 62 is preferably positioned in apparatus 10 so that the top end of the hammer shaft protrudes far enough through the upper stationary guide plate so as to allow a hammer cam 61 operably secured to a hammer cam return spring 59, seen in FIG. 5, to be installed and positioned on the top of hammer shaft 62. Hammer cam 61 is operably secured to trigger means 90 including trigger return spring 94, and trigger levers 92 seen in FIG. 50 which will not permit hammer shaft 62 to rotate until apparatus 10 is signaled and triggered. Once apparatus 10 is signaled and triggered, however, the trigger releases the hammer cam and the force of springs 52 rotate hammer shaft 62 out of its plane of travel and drive plates 44 will rotate with sufficient force to operate valve 12.

Figure 4:
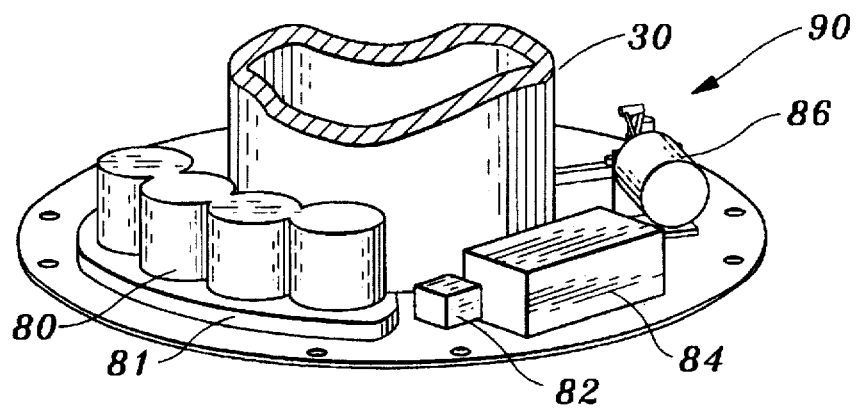
FIG. 4 shows a signal receiving means including electronics, battery and solenoid of such apparatus, according to the invention.

Signaling means allow for the control of apparatus 10 from a location at a distance from apparatus 10 and valve 12 and preferably comprises a battery pack 80 and battery plate 81 operably connected to radio receiver 82, transistor, diode and relay switch 84, and to solenoid 86, seen in FIGS. 4 and 5. Of course, other signaling means well known in the art may be used, however, wireless signaling means are preferred.

In operation and use once an activation signal is received and decoded by receiver 82, the relay switch energizes the solenoid 86. Solenoid 86 is operably connected to trigger mechanism 90 and releases hammer cam 61. Hammer shaft 62 is then pushed out of the way of drive plates 44 which are pulled by non-stationary rods 50 thereby moving along the arc dictated by the intersection of the two guide channels 48 and 58 resulting in rotation of drive drum 28 and the turning of valve stem 18.

As is evident from the above description, a wide variety of configurations of apparatus 10 may be fashioned from the present invention depending upon the particular valve type and application on which apparatus 10 will be used. Although apparatus 10 has been described in use with gas valves, the invention as disclosed herein may be used for the remote monitoring and control of any type of valve or application. Apparatus 10 allows for the activation of a valve by a coded electromagnetic signal which allows for actuation of the apparatus from a site distant from the actual valve location. Apparatus 10 may be retro-fitted onto existing valves or incorporated into new valves allowing for installation, replacement, and testing of the apparatus without discontinuance or interruption of service.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. An apparatus for controlling a valve by a coded electromagnetic signal, comprising;

saddle plate means for operable installation on said valve; said saddle plate means including an aperture therein allowing for placement of said saddle plate means over a valve stem of said valve; said saddle plate means being attached to a valve and include two arm elements extending therefrom and around the valve;

a drive drum operably secured to said saddle plate means; said drive drum including a drive drum tube for inserting through said aperture in the saddle plate means and being operably aligned with a valve stem drive plate; a pair of drive plates are attached to said drive drum tube and separated by alignment spaces; drive plate guide channels guide a non-stationary post attached to a plurality of drive springs secured by a plurality of stationary posts to an upper and a lower stationary guide plate, said plurality of springs being separated by a drive spring spacer element and operably secured to said drive drum;

a plurality of stationary guide plates, said plurality of stationary guide plates including an aperture through which said drive drum tube passes allowing the drive drum to rotate after activation of a trigger means by said coded electromagnetic signal;

a hammer shaft and a hammer shaft cam secured to said plurality of stationary guide plates; said plurality of springs being stretched by rotation of said drive drum allowing said hammer cam to be engaged with said pair of drive plates restraining said drive plates in a valve open position; and signal means for activating and energizing said trigger means for releasing said hammer cam from said pair of drive plates, said hammer shaft being moved thereby, allowing for rotation of said drive drum past said plurality of stationary plates whereby the valve stem of the valve is turned allowing for closure of said valve.

2. The apparatus for controlling the closure of a valve of claim 1, wherein said hammer shaft is cylindrically configured allowing for operable mating with a pivot hole in an upper stationary guide plate and a pivot hole in a lower stationary guide plate; said hammer shaft including two centrally positioned flat contact points which correspond to a pair of hammer stay notches in said drive plates.

3. The apparatus for controlling the closure of a valve of claim 1, wherein said signal means includes a battery operably linked to a radio receiver, a transistor, a diode, a relay switch, and to a solenoid.

4. The apparatus for controlling the closure of a valve of claim 1, wherein said apparatus is composed of non-corrosive materials.

5. An apparatus for controlling the closure of a valve at a distance from the valve which can be installed, inspected, replaced, and tested on the valve without disruption of the operation of the valve, comprising;

plate means for operable installation on said valve, said plate means including an aperture therein allowing for placement of said plate means over a valve stem of said valve; said plate means being secured to a valve saddle and include two elongated elements for placement around the valve;

a drive drum operably secured to said plate means; said drive drum including a drive drum tube for insertion through said aperture in said plate means and being operably aligned with a valve stem drive plate, a pair of drive plates, said drive plates being secured to said drum drive tube and separated by alignment spacers, one or more drive plate channels guide a non-stationary post attached to a plurality of drive springs secured by a plurality of stationary posts to an upper and a lower stationary guide plate; said plurality of springs being separated by a drive spring spacer element and being operably secured to said drive drum;

a plurality of stationary guide plates, said plurality of stationary guide plates each including an aperture therein through which said drive drum tube passes allowing said drive drum to rotate after activation of a trigger means by said coded electromagnetic signal;

a hammer shaft and a hammer shaft cam secured to said plurality of stationary guide plates; said plurality of springs being stretched by rotation of said drive drum allowing said hammer cam to be engaged with said pair of drive plates retraining said drive plates in a valve open position; and signal means for activating and energizing said trigger means for releasing said hammer cam from said pair of drive plates, said hammer shaft being moved thereby, allowing for rotation of said drive drum post said plurality of stationary plates whereby the valve stem of the valve is turned allowing for closure of said valve.

6. The apparatus of claim 5, wherein said hammer shaft is cylindrically configured allowing for operable mating with a pivot hole in an upper stationary guide plate and a pivot hole in a lower stationary guide plate; said hammer shaft further including two centrally positioned flat contact points which correspond to a pair of hammer stay notches in said drive plates.

7. The apparatus of claim 5, wherein said signal means includes a battery operably linked to a radio receiver means and to a solenoid.

8. The apparatus of claim 5, wherein said apparatus is composed of non-corrosive material.

9. The apparatus of claim 5, wherein said apparatus is composed of a non-explosive material.

10. The apparatus of claim 5, wherein a means for rendering a directed torque force is provided by said drive springs operably secured to said non-stationary posts and to said stationary posts; said non-stationary posts being moveable through said drive plate guide channels allowing for controlled and directed torque force to be imparted to said valve.

* * * * *